United States Patent Office 3,513,200
Patented May 19, 1970

3,513,200
PREPARATION OF TERTIARY AMINES
Giovanni Biale, Placentia, Calif., assignor to Union Oil Company of California, Los Angeles, Calif., a corporation of California
No Drawing. Continuation-in-part of application Ser. No. 619,568, Mar. 1, 1967. This application Nov. 25, 1968, Ser. No. 778,745
Int. Cl. C07c 85/14
U.S. Cl. 260—583      21 Claims

ABSTRACT OF THE DISCLOSURE

The invention relates to the preparation of tertiary amines by reaction of secondary amines with an ethylenically unsaturated compound, carbon monoxide and hydrogen in the presence of a complex catalyst comprising a Group VIII noble metal, a polycyclo, heterocyclic saturated amine, and a biphyllic ligand, e.g., an organic phosphine, arsine or stibine at temperatures between 50° and 200° C. and at pressures sufficient to maintain liquid phase conditions.

DESCRIPTION OF THE INVENTION

This application is a continuation-in-part of application Ser. No. 619,568, filed Mar. 1, 1967, now abandoned.

This invention relates to the preparation of tertiary amines from secondary amines by reaction with an ethylenically unsaturated compound, carbon monoxide and hydrogen. The tertiary amine products of the invention are useful as chemical intermediates and also find particular utility in preparation of quaternary ammonium complexes which are used as disinfectants and fungicides.

Preparation of tertiary amines by reaction of secondary amines with olefins, CO and hydrogen is known and is disclosed, e.g., in U.S. Pats. 2,422,631 and 3,234,283. It has now been found that this reaction may be advantageously carried out in the presence of a complex Group VIII noble metal catalyst, described in detail below, to give a high yield of the desired tertiary amine product.

The secondary amine reactant has the formula

in which R and R' are the same or different hydrocarbon radicals such as alkyl, aryl, alkaryl, aralkyl and cycloalkyl radicals. The secondary amine may contain from about 2 to 20 carbons with about 2 to 16 carbons being preferred. Suitable secondary amines include but are not limited to dimethylamine, diethylamine, dipropylamine, diisopropyl amine, di-n-butylamine, diisobutylamine, dipentylamine, di-2,2,4-trimethylpentyl amine, dihexylamine, ethylhexylamine, diheptylamine, dinonylamine, butylpentadecylamine, diphenylamine, ditolylamine, methylcumenylamine, dibenzylamine, methyl-2-phenylethylamine, methylnaphthylamine, diindenylamine, di-m-xylylamine, dioctenylamine, dipentenylamine, methylbutenylamine, dicyclopentylamine, di(methylcyclopentyl)amine, and butylcyclooctylamine, etc. The invention has been found to be particularly effective in preparation of tertiary amines from low molecular weight secondary alkyl amines having 2 to about 16 carbons, e.g., dimethylamine, diethylamine, dipropylamine, ethylpropylamine, dibutylamine, diheptylamine and dioctylamine, etc.

The ethylenically unsaturated compound may have from about 2 to about 20 carbons; preferably from 2 to about 12 carbons. It may be any of the following:

(1) Ethylene and substituted ethylenes such as:

$$R_2R_1C=CR_4R_3$$

wherein $R_1$, $R_2$, $R_3$ and $R_4$ are hydrogen, alkyl, cycloalkyl, aryl, alkaryl, aralkyl, alkenyl aryl, amino, amino alkyl, amino aryl, hydroxy, hydroxy alkyl, hydroxy aryl, etc., the preferred groups being hydrogen and alkyl;

(2) Cycloalkenes and substituted cycloalkenes such as:

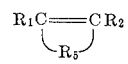

wherein $R_1$ and $R_2$ are as previously mentioned and $R_5$ is an alkylene or isoalkylene group having from 2 to about 6 carbons.

Examples of useful olefins are the hydrocarbon olefins such as ethylene, propylene, butene-1, butene-2, pentene-2, 2-methylbutene-1, hexene-1, 3-ethylhexene-1, octene-3, 2-propylhexene-1, decene-2, 4,4'-dimethyl nonene-1, dodecene-1, 6-propyldecene-1, tetradecene-5, 7-amyldecene-3, hexadecene-1, 4-ethyltridecene-2, octadecene-1, 5,5-dipropyldodecene-3, eicosene-7, etc. Of these the aliphatic hydrocarbon olefins having from about 2 to 8 carbons are preferred and most preferred are the alpha olefins having terminally unsaturated carbons. Choice of the particular olefin depends of course on the desired product.

Other olefins that can be used include vinyl cyclohexane allyl cyclohexane, styrene, p-methyl styrene, alpha methyl styrene, beta methyl styrene, p-vinyl cumene, beta vinyl naphthalene, 1,2-diphenyl ethylene, allyl benzene, 6-phenylhexene-1, 1,3-diphenylbutene-1, 3-benzoheptene-3, o-vinyl p-xylene, m-amino styrene, divinyl benzene, 1-allyl 4-vinyl benzene, allyl amine, p-aminostyrene, allyl aniline, crotonyl alcohol, allyl carbinol, beta-allylethyl alcohol, allylmethylpropylcarbinol, allylphenol, etc.

Cycloalkenes and their substituted derivatives include cyclobutene, cyclopentene, cyclohexene, methylcyclohexene, amylcyclopentene, cycloheptene, cyclooctene, cyclodecene, etc.

The catalyst employed in the present invention comprises a Group VIII noble metal in complex with a biphyllic ligand and preferably also in complex with carbon monoxide and/or hydride. Inclusion of a poly(heterocyclo) amine is normally preferred to achieve high yields, especially when the catalyst is not in the form of a hydride. The exact identity of the catalyst is not known with certainty since in the presence of the carbon monoxide, ethylenically unsaturated compound and amine, complexes and carbonyls of the Group VIII noble metal can be readily formed. This is particularly true in regard to the catalyst hereafter described which also contains a poly(heterocyclo)amine.

The Group VIII noble metal can be palladium, rhodium, ruthenium, platinum, osmium or iridium. While catalysts containing any of these metals are active for the reaction, I prefer to employ rhodium containing catalysts because of their demonstrated greater activity, particularly at the relatively mild reaction conditions employed for the reaction. A catalytic quantity of the Group VIII noble metal-containing catalyst is used. This is generally an amount sufficient to provide a concentration of the Group VIII noble metal which is between about 0.002 and about 2.0 weight percent of the liquid reaction medium and preferably between about 0.05 and about 0.5 weight percent. The Group VIII noble metal can be added to the reaction medium as a soluble salt, a carbonyl compound or chelate but is preferably added as a hydride and most preferably as a hydride complexed with carbon monoxide and with a biphyllic ligand, e.g., tris(triphenylphosphine) rhodium carbonyl hydride. Examples of suitable salts are the nitrates and halides of the metals such as palladium chloride, palladium nitrate, rhodium acetate, ruthenium bromide, osmium fluoride, palladium chloride, etc. Examples of suitable chelates are palladium acetyl acetonate and complexes of the platinum group metal ions with such conventional chelating agents as ethylenediamine tetraacetic acid and its alkali metal salts, citric acid, etc. The carbonyl of the Group VIII noble metal can be prepared externally (e.g., by contacting the metal salt, hydride or chelate with carbon monoxide at high pressure in the liquid phase) and introduced into the reaction medium; preferably, however, the carbonyl compound is produced in situ by the addition of the aforementioned soluble salt, hydride or chelates of the Group VIII noble metal and introduction of the carbon monoxide during the reaction to form the active carbonyl complex.

The hydride form of the catalyst can be formed from the Group VIII noble metal salts previously mentioned. In this preparation the Group VIII noble metal salt is subjected to a reduction with a strong reducing agent and this reduction can be performed in the presence of either or both of the carbon monoxide and the biphyllic ligand and may be performed prior to the catalyst being introduced into the reaction zone or may be performed "in situ." When only one of these components is present during the reduction, the remaining component can be added after the reduction to form the catalyst complex. Suitable strong reducing agents comprise hydrogen or the alkali metal hydrides and the alkali metal boron and aluminum hydrides such as sodium hydride, potassium hydride, lithium hydride, boron hydride, e.g., sodium borohydride, potassium borohydride, lithium borohydride, cesium borohydride, sodium aluminum hydride, lithium aluminum hydride, potassium aluminum hydride, cesium aluminum hydride, etc., in a suitable inert organic solvent such as any of those aforementioned. When non-halide sources are used such as when the nitrate or sulfate salts are used, reduction to the hydride can be achieved by treatment with hydrazine using any inert organic solvent such as those aforementioned. The reduction is performed at relatively mild temperatures from about 25° to about 75° C. and, preferably, is performed in aqueous alkanol solvent. The reduction results in the reduction of the metal salt, e.g., rhodium nitrate to rhodium hydride. When this reaction is performed in the presence of the organic ligand and/or under carbon monoxide pressure, the Group VIII noble metal hydride complex with carbon monoxide and/or triphenylphosphine can be obtained directly.

A compound preferably employed with the aforementioned Group VIII noble metal is a poly(heterocyclo)-amine having at least one nitrogen in a bridgehead position. The term "bridgehead position" is well established in chemical nomenclature to identify the position of an atom which is common to at least two of the rings of the polycyclic compound. Preferably the amine is an atom-bridged system, i.e., atoms, generally methylene carbons, form the bridge or line in the molecule rather than a simple valence bonding. The amine is also used in catalytic amounts, e.g., from about 0.001 to about 10 weight percent; preferably from about 0.05 to 5 weight percent of the liquid reaction medium. In general, amines having from 1 to about 4 nitrogen atoms and from 1 to about 25 carbons, preferably from 2 to about 10 carbons, can be employed for this purpose the most preferred being the bi(heterocyclo) saturated amines with 1 or 2 nitrogens and the following is a listing of representative amines useful in my invention: 1,2,4-triazabicyclo(1.1.1)pentane; 1,5,6 - triazabicyclo(2.1.1)hexane; 5 - oxa - 1,6 - diazabicyclo(2.1.1)hexane; 5-thia-1,6-diazabicyclo(2.1.1)hexane; 2-oxa-1,5,6-triazabicyclo(2.1.1)hexane; 1,2,5,6-tetrazabicyclo(2.1.1)hexane; 5 - oxa-1,2,3,6-tetrazabicyclo(2.1.1) hexane; 1-azabicyclo(3.3.1)heptane; 1-azabicyclo(2.2.1) heptane; 1,4-methano-1,1-pyrindine; 2-ox-1-azabicyclo (2.2.1)heptane; 1,4-diazabicyclo(2.2.1)heptane; 7-oxa-1-azabicyclo(2.2.1)heptane; 7 - thia-1-azabicyclo(2.2.1)heptane; 1,7-diazabicyclo(2.2.1)heptane; 1,3,5-triazabicyclo (2.2.1)heptane; 1-azabicyclo(3.2.1)octane; 1,5-diazatricyclo(4.2.1)decane; 1,7 - diazatricyclo(3.3.1.2)undecane; 7-ox-1-azabicyclo(3.2.1)octane; 1,7 - diazabicyclo(3.2.1) octane; 3-thia-1,7-diazabicyclo(3.2.1)octane; 1,3,6,8-tetrazatricyclo(6.2.1.1)dodecane; 2,8 - diazatricyclo(7.3.1.1) tetradecane; 1-azabicyclo(3.3.1)nonene, also known as 1-isogranatinine and the oxo, hydroxy and lower alkyl derivatives thereof; 1-azabicyclo(2.2.2)octane also known as quinuclidine as well as the halo, oxo, hydroxy and lower alkyl derivatives thereof; 1-azatricyclo(3.3.1.1)decane; 1,3-diazabicyclo(2.2.2)octane; 1,3 - diazabicyclo(3.3.1) nonene; 1,6-diazatricyclo(5.3.1.1)dodecane; 2-ox-1-azabicyclo(2.2.2)ocane; 4,6,10 - triox - 1 - azatricyclo(3.3.1.1) decane; 1,5-diazabicyclo(3.3.1)nonene; 1,2,5,8-tetrazatricyclo(5.3.1.1)dodecane; 1,4 - diazabicyclo(2.2.2)octane also known as triethylene diamine and its oxo, hydroxy, halo and lower alkyl derivatives thereof; 1,3-diazatricyclo (3.3.1.1)decane also known as 1,3-diazaadamantane; 1,3,5 - triazatricyclo(e.e.1)decane; 1,3,5,7 - tetrazabicyclo (3.3.1)nonene also known as pentamethylene tetramine; 1,3,5,7-tetrazatricyclo(3.3.1.1)decane also known as hexamethylene tetramine; 2-oxa-1,3,4-triazabicyclo(3.3.1) nonene; 1-azabicyclo(4.3.1)decane; 1-azabicyclo(3.2.2) none; 1,5-diazabicyclo(3.2.2)nonene; 1,3,5,7-tetrazabicyclo(3.3.2)decane; 1,5-diazabicyclo(3.3.3)undecane; etc.

Of the aforementioned poly(heterocyclo)amines having a nitrogen in a bridgehead position the most common and widely known compound is 1,4-diazabicyclo(2.2.2)octane and this material as well as its oxo, hydroxy, halo and lower alkyl derivatives comprises the preferred cocatalyst for use in my process.

The catalyst also comprises a third component which is a biphyllic ligand, i.e., a compound having an element with a pair of electrons capable of forming a coordinate bond with a metal atom and simultaneously having the ability to accept the electron from the metal, thereby imparting additional stability to the resulting complex. Biphyllic ligands can compromise organic compounds having at least about 3 carbons and containing arsenic, antimony or phosphorus in a trivalent state. Of these, the phosphorus compounds, i.e., the phosphines, are preferred; however, the arsines and stibines can also be employed. In general these biphyllic ligands have the following structure:

E(R)₃ or the following structure:

(R)₂ER'E(R)₂ wherein E is a trivalent atom selected from the class consisting of phosphorus, arsenic and antimony; and
wherein R is a member of the class consisting of hydrogen, alkyl from 3 to 8 carbon atoms, aryl from 6 to 8 carbons and halo, amino and $C_1$–$C_5$ alkoxy substitution products thereof; and
wherein R' is alkylene having from 1 to about 8 carbons.

Examples of suitable biphyllic ligands having the aforementioned structures and useful in my invention to stabilize the catalyst composition are the following: trimethyl phosphine, triethyl arsine, triisopropyl stibine, diethyl chloromethyl phosphine, triaminobutyl arsine, ethyldiisopropyl stibine, tricyclohexyl phosphine, triphenyl phosphine, trianisylphosphine, tri(m-ethoxyphenyl)arsine, tri-(o-butoxyphenyl)stibine, tri(o-tolyl)phosphine, phenyldiisopropyl phosphine, phenyl diamyl phosphine, diphenylethyl phosphine, tri(chloroxylyl)phosphine, tri(chlorophenyl)phosphine, tris(diethylaminomethyl)phosphine, trimethylene bis(diphenyl phosphine), hexamethylene bis-(diisopropyl arsine), pentamethylene bix(diethylstibine), tri(p-aminophenyl)phosphine, tri(p-N,N-dimethylaminophenyl)arsine, tri(propylaminophenyl)phosphine, etc. Of the aforementioned, the triaryl phosphines (e.g., triphenyl phosphine) are preferred because of their demonstrated greater activity for stabilization of catalysts.

The biphyllic ligand may be added directly to the reaction medium and/or introduced into the medium as a complex with the Group VIII noble metal salt, chelate or hydride or with a carbonyl of the same. The biphyllic ligand is preferably used in excess (e.g., 30% to 300%)

of that required to form a complex with the Group VIII noble metal, the complex generally comprising 1 to about 5 moles of biphyllic ligand per atom of the metal.

The reaction is performed under liquid phase conditions and when the ethylenically unsaturated compound comprises a liquid at the reaction conditioins this material can be used in excess to provide the liquid reaction medium. If desired, however, any suitable organic liquid can be employed as a reaction solvent, preferably organic solvents which are inert to the reaction conditions, the reactants, the catalyst and the products. Examples of suitable solvents that can be used in accordance with my invention include hydrocarbons such as the aromatics, aliphatics or alicyclic hydrocarbons, ethers, esters, ketones, etc.

Examples of suitable hydrocarbons that can be employe in the solvents include aromatic hydrocarbons such as benzene, toluene, xylene, ethylbenzene, tetralin, etc.; aliphatic hydrocarbons such as butane, pentane, isopentane, hexane, isohexane, heptane, octane, isooctane, naphtha, gasoline, kerosene, mineral oil, etc.; alicyclic hydrocarbons, e.g., cyclopentane, cyclohexane, methylcyclopentane, decalin, indane, etc.

Various alkyl and aryl ketones can also be employed as the reaction solvent, e.g., acetone, methylethyl ketone, diethyl ketone, diisopropyl ketone, ethyl-n-butyl ketone, methyl-n-amyl ketone, cyclohexanone, di-iso-butyl ketone, etc.

Ethers can also be employed as the reaction solvent, e.g., diisopropyl ether, di-n-butyl ether, ethylene glycol diisobutyl ether, methyl o-tolyl ether, ethylene glycol dibutyl ether, diisoamyl ether, methyl p-tolyl ether, methyl m-tolyl ether, dichloroethyl ether, ethylene glycol diisoamyl ether, diethylene glycol diethyl ether, ethylbenzyl ether, diethylene glycol diethyl ether, diethylene glycol dimethyl ether, ethylene glycol dibutyl ether, ethylene glycol diphenyl ether, triethylene glycol diethyl ether, diethylene glycol di-n-hexyl ether, tetraethylene glycol dimethyl ether, tetraethylene glycol dibutyl ether, etc.

Various esters can also be employed as the solvent, e.g., ethyl formate, methyl acetate, ethyl acetate, n-propyl formate, isopropyl acetate, ethyl propionate, n-propyl acetate sec-butyl acetate, isobutyl acetate, ethyl n-butyrlate, n-butyl acetate, isoamyl acetate, n-amyl acetate, ethyl formate, ethylene glycol diacetate, glycol diformate, cyclohexyl acetate, furfuryl acetate, isoamyl n-butyrate, diethyl oxalate, isoamyl isovalerate, methyl benzoate, diethyl malonate, valerolactone, ethyl benzoate, methyl salicylate, n-propyl benzoate, n-dibutyl oxalate, n-butyl benzoate, diisoamyl phthalate, dimethyl phthalate, diethyl phthalate, benzyl benzoate, n-butyl phthalate, etc. A preferred class of ester solvents includes the lactones, e.g., butyralactone, valerolactone and their derivatives having lower ($C_1$–$C_5$) alkyl substituents.

Alcohols can also be employed as a reaction solvent. Preferably tertiary alcohols, such as t-butyl or t-amyl alcohol, are employed since these materials are substantially non-reactive under the reaction conditions. Primary and secondary alcohols can be employed but are less preferred since these materials can result in formation of undesired byproducts.

The reaction is performed under relatively mild conditions including temperatures from about 50° to about 200° C.; preferably from about 70° to about 150° C. Sufficient pressure is used to maintain the reaction medium in liquid phase. Although atmospheric pressure can be used, the rate of reaction is increased by super-atmospheric pressures and, therefore, pressures from about 5 to about 300 atmospheres and preferably from about 10 to about 100 atmospheres are used. The ratio of the reactants can be widely varied if desired, e.g., the molecular ratio of hydrogen to carbon monoxide can be varied from about 1:10 to about 10:1. The preceding conditions are maintained by conventional means. Since the reaction is exothermic, the temperature can be maintained by suitable cooling of all or a portion of the reaction zone contents. The pressure can be maintained by the pressure of the gases supplied to the reaction zone. If desired, a suitable inert gas, such as nitrogen, can also be charged to the reaction zone to reduce the partial pressures of the reacted gases, i.e., hydrogen and carbon monoxide.

The relative concentration of the carbon monoxide and hydrogen significantly affects the yield and the distribution of the normal and branched chain isomers in the product. It is preferred that the hydrogen concentration be at least the same as the carbon monoxide concentration and hydrogen to carbon monoxide ratios of 2:1 to 10:1 are preferred.

The selectivity of the reaction for a straight chain amine can also be increased by including limited amounts of water in the reaction zone. The practice of the invention under substantially anhydrous conditions with about equal molar quantities of carbon monoxide and hydrogen produces about twice as much of the straight chain amine as the branched chain amine. The addition of water to this reaction in amounts from up to about 50 percent of the liquid reactants can increase the yield of water in the reaction zone. The practice of the inchain compound. The aforementioned increase in hydrogen concentration, relative to carbon monoxide, can also be performed in the partially aqueous solvent to obtain even greater yields of the straight chain product. Preferably water from 5 to about 30 weight percent of the liquid reactants is used, the maximum water content being limited to maintain a soluble medium for the catalyst and the ethylenically unsaturated compound.

The process can be conducted continuously or batchwise; however, the continuous processing is preferred. In the latter preferred technique, the catalyst is charged to the reaction zone in a suitable solvent or in excess of the ethylenically unsaturated compound and the gaseous reactants are introduced into contact with the reaction solvent and catalyst in the reaction zone. A continuous withdrawal of the liquid phase in the reaction zone can be employed; this material is then reduced in pressure to remove the dissolved gases which can be recycled, cooled and then distilled to recover the desired products. When low molecular weight products are produced they can be recovered by employing a high gas rate through the reactor to strip the product from the reaction solvent which, desirably, is a higher boiling liquid such as tertiary butanol, tertiary amyl alcohol, butyrolactone, etc.

Because the reaction conditions are very mild, the products can remain in the reaction zone without encountering undue degradation to less desired products and therefore batchwise operation can be practiced by introducing the ethylenically unsaturated hydrocarbon, hydrogen and carbon monoxide into contact with the catalyst solution until a sufficient inventory of product is accumulated in the reaction zone and thereafter the reaction discontinued and the product recovered by suitable steps, typically distillation.

The major product of the reaction is the straight chain amine and the only other nitrogen-containing product in significant quantities is a lesser amount of the branched chain amine. This result is particularly surprising when the preferred catalyst, i.e., rhodium, is employed since the use of rhodium in previous reactions is known to catalyze the formation of the branched chain products. In the presence of the catalysts of my invention I have discovered that not only is the reaction rate accelerated but the nature of the product is altered in favor of the straight chain amines and in favor of an aldehyde by-product rather than an alcohol by-product as in the processes of the prior art. Formation of the aldehyde rather than an alcohol is desirable because the aldehyde may be recycled to the reaction medium for conversion to a tertiary amine and because an aldehyde, being more reactive than an alcohol, is a more valuable product.

The practice of the invention will now be illustrated by the following examples which will also serve to demonstrate the results obtainable thereby:

EXAMPLES 1 AND 2

A solution of 0.3 gram [Rh(I)Cl(CO)(triphenylphosphine)] complex, 2 grams triphenylphosphine, 2 grams 1,4-diazabicyclo(2.2.2) octane, 92 grams (1 mole) dibutylamine in 300 grams t-amyl alcohol was placed in a stirred autoclave. About 100 grams propylene was added. Then the clave was pressured with 300 p.s.i. CO and 600 p.s.i. $H_2$ and heated to 107° C. for 15 minutes. A pressure drop of about 200 p.s.i. was observed. Distillation of the product yielded 16 grams of butyraldehyde, the solvent (t-amyl alcohol), 68.8 grams of unreacted dibutylamine and 14.4 grams of tributylamine. In another run, the reaction was allowed to proceed for 45 minutes and 27 grams of tributylamine, 16 grams of butyraldehyde and no detectible quantity of alcohol (other than solvent) was obtained.

When hexene is substituted for propylene and when dioctylamine is substituted for dibutylamine similar results are obtainable.

When octane is substituted for propylene the corresponding tertiary amine is again obtainable.

EXAMPLES 3 TO 9

Reactants and reaction conditions and results of these examples are shown in the following table. The procedure was otherwise similar to that of Examples 1 and 2. In these runs the principal by-product was butyraldehyde and no substantial quantity of alcohol (other than solvent) was obtained.

by gas chromatography to indicate that heptyldioctylamine and by-product butyraldehyde are formed.

When 100 grams of diheptylamine are substituted for the 92 grams of dipropylamine and ethylene is pressured into the autoclave in place of the 100 grams of hexene, it is found that propyldiheyptylamine is formed.

When 80 grams of diethylamine are substituted as the secondary amine and propylene is the olefin and when $Pd(H)(CO)[(C_6H_5)_3P]_3$ is substituted for the rhodium complex, it is found that butyldiethylamine is again formed.

I claim:

1. In a process for the preparation of a tertiary dialkyl hydrocarbon amine comprising reacting a secondary amine having 2 to about 20 carbons, an aliphatic hydrocarbon olefin having 2 to about 20 carbons, carbon monoxide and hydrogen at a temperature between about 50° and about 200° C. and at a pressure sufficient to maintain liquid phase reaction conditions, the improvement of carrying out the reaction in the presence of a catalyst comprising a Group VIII noble metal hydride in complex with a biphyllic ligand having the Formula $E(R)_3$ or $(R)_2ER'E(R)_2$ wherein E is phosphorus, arsenic or antimony, R is hydrogen, an alkyl having 1 to about 8 carbons, aryl having about 6 to 8 carbons and halo and alkoxy substitution products thereof and wherein R' is alkylene having 3 to about 8 carbons.

2. The process of claim 1 wherein the aliphatic olefin is an aliphatic alpha olefin having 2 to about 8 carbons.

3. The process of claim 1 wherein the reaction medium also includes a poly(heterocyclo) saturated amine having 1 to 4 nitrogens and 2 to 10 carbons and at least one nitrogen in a bridgehead position.

TABLE I

| Ex. | Catalyst Composition | | | Amine, grams | Solvent, grams | Olefin | CO, p.s.i. | $H_2$, p.s.i. | Temp., °C. | Run time, min. | T-amine, grams |
|---|---|---|---|---|---|---|---|---|---|---|---|
| | Metal Salt | Ligand | Other, grams | | | | | | | | |
| 3 | RhCl(CO)($\phi_3P)_2$, 0.3 | $\phi_3P$, 2.0 | DABCO,[1] 2.0 | Dibutyl, 92.0 | t-Amyl alcohol, 250 | Propylene | 300 | 600 | 107 | 15 | 14 |
| 4 | do | do | do | do | do | do | 300 | 600 | 121 | 45 | 27 |
| 5 | do | do | do | do | do | do | 450 | 450 | 121 | 60 | 9 |
| 6 | RhCl₃, 0.3 | do | do | do | t-Butyl alcohol, 250 | do | 300 | 600 | 121 | 30 | 44 |
| 7 | do | do | None | do | do | do | 300 | 600 | 79 | 60 | |
| 8 | do | do | do | do | do | do | 300 | 600 | 121 | 30 | 0.4 |
| 9 | do | Bu₃P, 2.0 | DABCO,* 2.0 | do | do | do | 300 | 600 | 121 | 60 | 3 |

[1] 1,4-diazabicyclo(2.2.2)octane.

EXAMPLE 10

The rhodium hydride catalyst,

is prepared by adding 0.5 gram of bis(triphenylphosphine)rhodium carbonyl chloride,

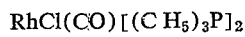

and one gram of triphenylphosphine, $(C_6H_5)_3P$, to 50 milliliters of methanol and warmed to 55° C. To the suspension is then slowly added 50 milliliters of methanol containing 2 grams of sodium borohydride. The addition is complete within about 15 minutes and the suspension is then cooled and filtered and the separated solid was washed thoroughly with methanol and air dried. The recovered solid is a yellow, crystalline material having a melting point of 125° C. and a characteristic infrared spectra indicating the presence of the rhodium hydride.

The tertiary amine is prepared by charging 0.5 gram of $Rh(H)(CO)[C_6H_5)_3P]_3$, 2 grams of triphenylphosphine, 92 grams of dioctylamine in 300 grams of toluene into a half-gallon, stainless steel autoclave together with 100 grams of hexene. The autoclave is pressured to 300 p.s.i.g. with carbon monoxide and an additional 600 p.s.i.g. with hydrogen and then heated to about 72° C. for about 20 minutes. The autoclave is then cooled, vented and the liquid products are removed and analyzed 4. The process of claim 3 wherein the poly(heterocyclo) saturated amine is 1,4-diazabicyclo(2.2.2)octane.

5. The process of claim 1 wherein the biphyllic ligand is triphenylphosphine and said Group VIII noble metal is rhodium.

6. In a process for the preparation of a tertiary amine comprising reacting a secondary amine having 2 to about 16 carbons and having the formula R'RNH wherein R' and R are alkyl, an aliphatic olefin having 2 to about 18 carbons, carbon monoxide and hydrogen at a temperature between about 50° and about 200° C. and at a pressure sufficient to maintain liquid phase reaction conditions, the improvement of carrying out the reaction in the presence of a catalyst comprising a Group VIII noble metal hydride in complex with a triaryl phosphine.

7. The process of claim 6 wherein the Group VIII noble metal is rhodium.

8. The process of claim 7 wherein the rhodium is in complex with a carbonyl.

9. The process of claim 7 wherein the rhodium is added to the reaction medium as a complex with hydride.

10. The process of claim 6 wherein the reaction medium includes a bi(heterocyclo) saturated amine having 1 to 2 nitrogens and 1 to 10 carbons and having at least one nitrogen in a bridgehead position.

11. The process of claim 10 wherein the bi(heterocyclo) saturated amine is 1,4-diazabicyclo(2.2.2)octane.

12. The process of claim 6 wherein the ratio of hydrogen to carbon monoxide is at least 2:1.

13. The process of claim 11 wherein the raio of hydrogen to carbon monoxide is at least 2:1.

14. The process of claim 11 wherein the Group VIII noble metal is rhodium and the triaryl phosphine is triphenylphopshine.

15. The process of claim 14 wherein said olefin is an alpha olefin having 2 to about 8 carbons.

16. In a process for the preparation of a tertiary dialkyl hydrocarbon amine comprising reacting a secondary amine having 2 to about 20 carbons, an aliphatic hydrocarbon olefin having 2 to about 20 carbons, carbon monoxide and hydrogen at a temperature between about 50° and about 200° C. and at a pressure sufficient to maintain liquid phase reaction conditions, the improvement of carrying out the reaction in the presence of a catalyst comprising a Group VIII noble metal in complex with a biphyllic ligand having the formula $E(R)_3$ or $(R)_2ER'E(R)_2$ wherein E is phosphorus, arsenic or antimony, R is hydrogen, an alkyl having 1 to about 8 carbons, aryl having about 6 to 8 carbons and halo and alkoxy substitution products thereof and wherein R' is alkylene having 3 to about 8 carbons; and in the presence of a catalytic amount of a bi or tri (heterocyclo) saturated amine having 1 to about 4 nitrogens and 2 to about 10 carbons and having at least one nitrogen in a bridgehead position.

17. The process of claim 16 wherein said Group VIII noble metal is rhodium.

18. The process of claim 17 wherein said aliphatic olefin is an alpha olefin, said biphyllic ligand is a triarylphosphine and said bi or tri (heterocycle) saturated amine is a bi(heterocyclo) saturated amine having 1 or 2 nitrogens and 2 to 10 carbons.

19. The process of claim 18 wherein said saturated amine is 1,4-diazabicyclo(2.2.2)octane.

20. The process of claim 1 wherein said Group VIII noble metal is rhodium.

21. The process of claim 2 wherein said Group VIII noble metal is rhodium.

References Cited

UNITED STATES PATENTS

| 2,422,631 | 6/1947 | Olin et al. | 260—583 |
| 3,234,283 | 2/1966 | Finch et al. | 260—583 |
| 3,412,158 | 11/1968 | McClain. | |

CHARLES B. PARKER, Primary Examiner

R. L. RAYMOND, Assistant Examiner

U.S. Cl. X.R.

252—430; 260—568, 570.9, 576, 577, 585